United States Patent [19]

Chen

[11] 4,282,017
[45] Aug. 4, 1981

[54] AUTOMOBILE DIRTY SMOKE ELIMINATOR

[76] Inventor: Hsi-Chi Chen, 435-8 Peitun Rd., Taichung City, Taiwan

[21] Appl. No.: 74,892

[22] Filed: Sep. 12, 1979

[51] Int. Cl.³ ............................................. B01D 47/02
[52] U.S. Cl. ....................................... 55/247; 55/256; 55/DIG. 30; 60/310; 261/93
[58] Field of Search ................. 55/255, 256, DIG. 30, 55/95, 247, 249; 60/310; 261/121 R, 93; 181/221

[56] References Cited

U.S. PATENT DOCUMENTS

| | | | |
|---|---|---|---|
| 632,370 | 10/1899 | Rossler | 55/247 |
| 1,032,536 | 7/1912 | Gerli et al. | 55/247 |
| 2,527,004 | 10/1950 | Fett | 55/248 |
| 2,612,745 | 10/1952 | Vecchio | 60/310 |
| 3,696,619 | 10/1972 | Rosa | 55/DIG. 30 |
| 4,137,715 | 2/1979 | Tung-lung | 60/310 |

FOREIGN PATENT DOCUMENTS 48093  8/1889  Fed. Rep. of Germany ...... 261/121 R

*Primary Examiner*—Bernard Nozick
*Attorney, Agent, or Firm*—Cushman, Darby & Cushman

[57] ABSTRACT

An automobile dirty smoke eliminator which mainly consists of two oval tin plates externally, and upper and lower exhaust pipes, left and right support plates, a blade, a discharge chamber, a discharge pipe, etc. internally. The principle of the present invention mainly consists in making use of the effect of mixing water and gas to entirely eliminate automobile dirty smoke. When the dirty smoke (exhaust gas) of automobile enters into the lower exhaust pipe of the present invention, the blade at the outlet of said lower exhaust pipe submerged in water is impacted by the compression force derived from the engine exhaust stroke so as to generate a mixture of said water and exhaust gas and to form a whirlpool having many buddles. The effect of walls of left and right support plates promote the toxin in the said dirty smoke (exhaust gas) automatically to deposit in the said water. The surplus toxin is discharged through the upper exhaust pipe and then mixed with the water to form a colorless, odorless nontoxious fog-like vapor which exhausts through the discharge pipe in order to achieve the best result of eliminating the said dirty smoke (exhaust gas).

5 Claims, 6 Drawing Figures

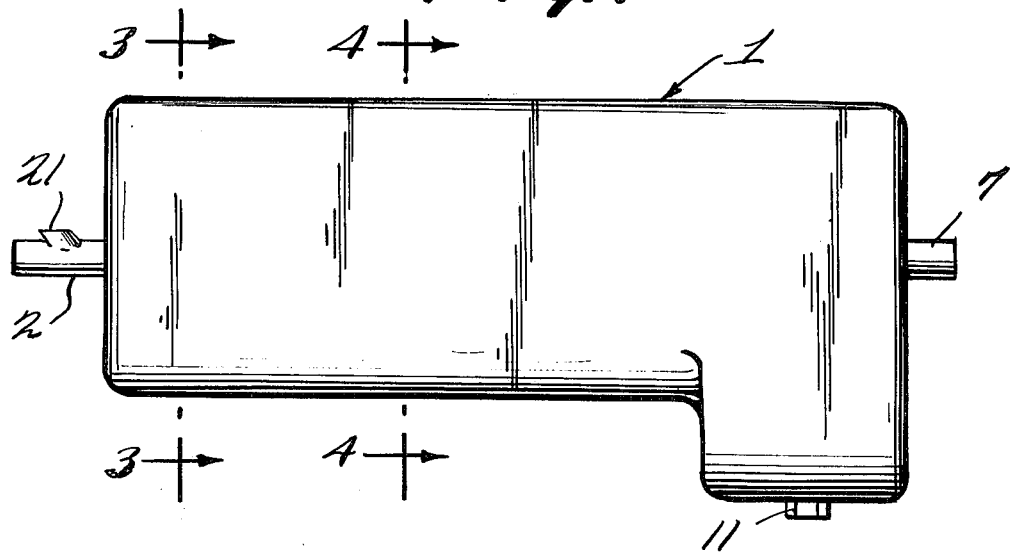
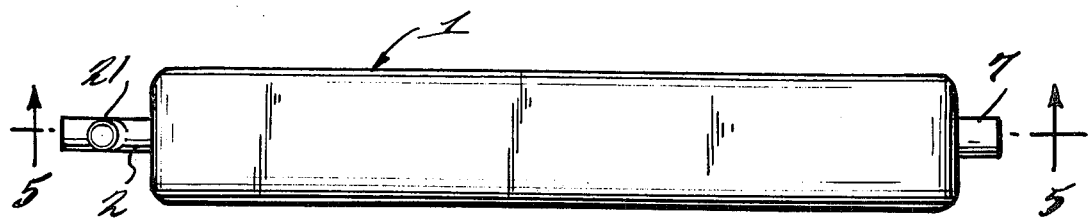
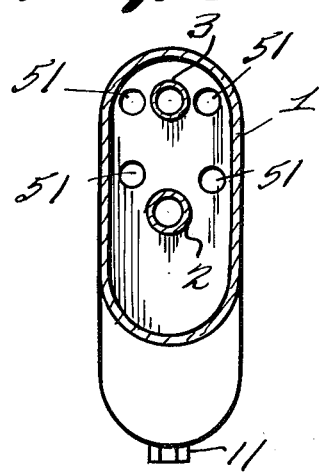
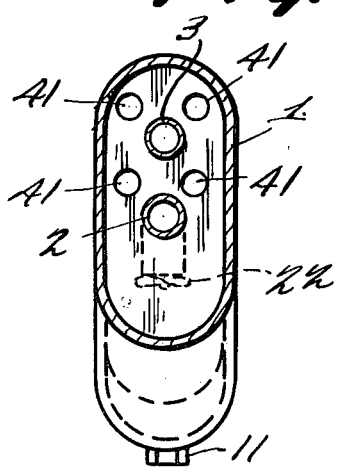

AUTOMOBILE DIRTY SMOKE ELIMINATOR

BACKGROUND OF THE INVENTION

Nowadays in the society, along with the scientific development day after day and the human beings' pursuit of newer ideal, various civilized products are born without end. For example, the annual yield of the commonest means of transportion—the automobile—has been steadily increasing year after year. Everyday thousands and millions of automobiles are running on the highways everywhere, but the dirty smoke (exhaust gas) discharged by these automobiles does harm to the health of human beings. This undesirable situation has now become the most serious personal problem. Therefore, how to effectively and rapidly prevent such dangers to health from happening depends on our common effort. In view of the above, the inventor of the present invention has spared no effort to study and test it for many years and eventually created the said automobile dirty smoke eliminator.

SUMMARY OF THE INVENTION

The above-said automobile dirty smoke eliminator can eliminate the dirty smoke (exhaust gas) from the automobile engine and decrease the damage caused by said smoke to their health. The outstanding advantages of the present invention are described as follows:

(1) The automobile dirty smoke eliminator of the present invention with a handy appearance and a portable construction is extremely effective, because the gas exhausted by the discharge pipe of said eliminator is a colorless, odorless, nontoxious and fog-like vapor.

(2) The installation of a collateral water tank of the present invention depends on the types of automobile. It can be installed beneath the chassis of a cargo truck, in the rear of a bus driver's cab or in the trunk of a car. A pipe from the installed water tank is connected with the water filler at the front end of the lower exhaust pipe of the present invention which can be continuously used for 8 hours and then the water is refilled into tank. It is extremely simple and convenient to clean the dirty water every other 24 hours.

(3) On account of the effect of the support plates to block the bubbles, the present invention can eliminate the noise of the engine and achieve the result of entirely deadening such noise. Therefore it is unnecessary to install a muffler for the automobile exhaust pipe.

(4) The automobile dirty smoke eliminator of the present invention with a magic result is derived from experimentation and proof for many years and can achieve the purpose of entirely eliminating the said dirty smoke (exhaust gas).

In view of the above, putting the present invention into practice will be extremely wide-spread and practicable. According to our market survey and information collected, such an invention will play an extremely active role in the automobile industry. In a word, such an invention is an extremely thoughtful masterpiece of the inventor.

BRIEF DESCRIPTION OF THE DRAWINGS

FIGS. 1 and 2 are front and side views of the automobile dirty smoke eliminator of the present invention;

FIGS. 3 and 4 are sectional views along lines 3—3 and 4—4 in FIG. 1, respectively;

DESCRIPTION OF THE PREFERRED EMBODIMENT

Figure 5:
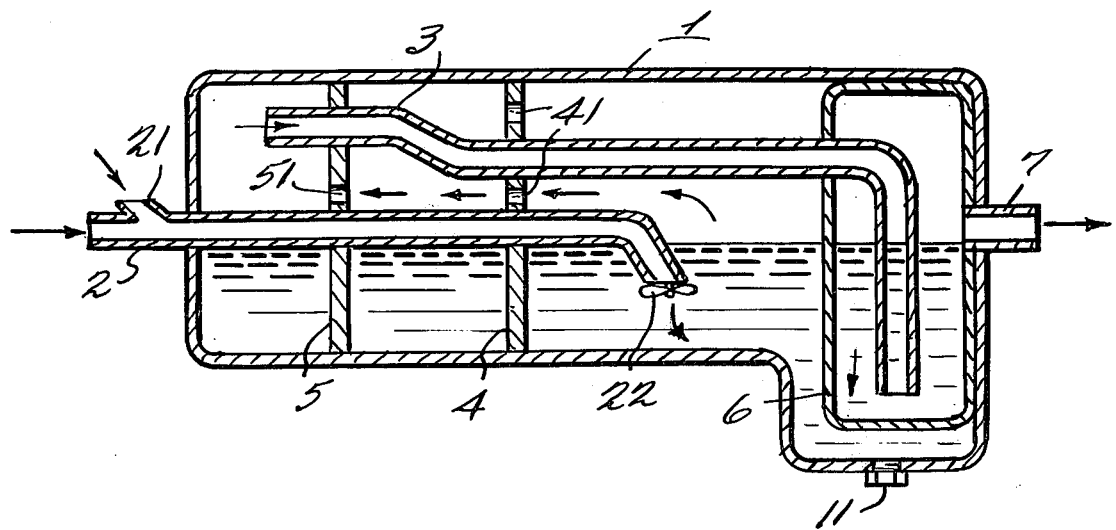
FIG. 5 is a sectional view.
Figure 6:
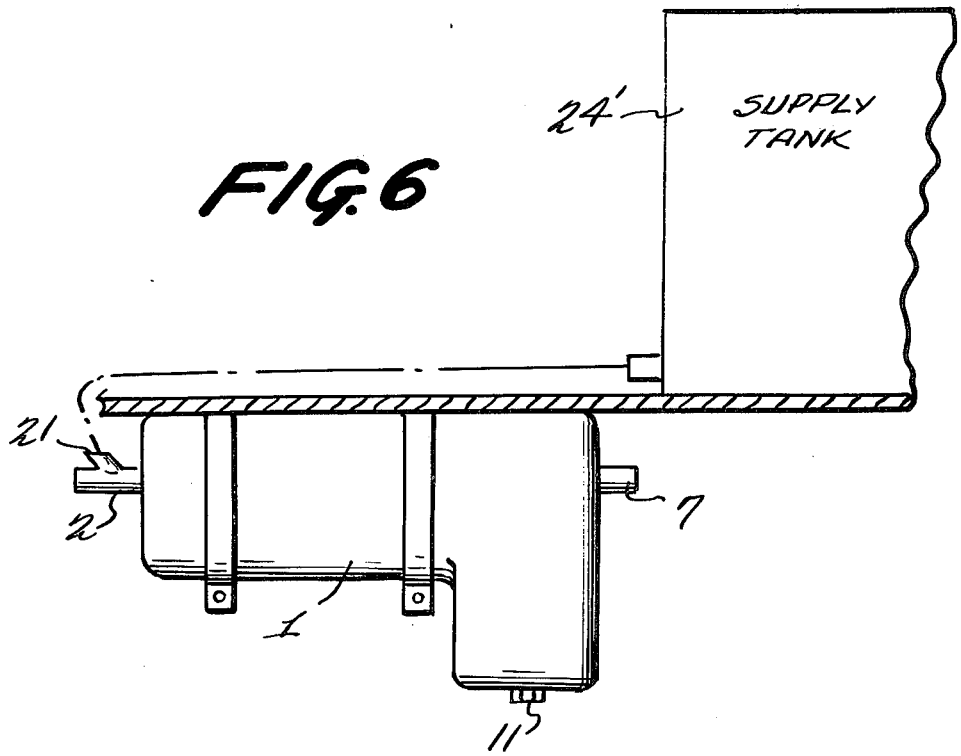
FIG. 6 is a front view showing the supply tank.

Now with reference to the drawings mentioned above, the structure of the present invention is described in detail as follows:

As shown in the Figures, the present invention mainly consists of two oval tin plates 1 externally, and upper and lower exhaust pipes 2 and 3, a water filler 21 at the front end of lower exhaust pipe 2 for applying water from tank 24', blade 22 at the rear end thereof, left and right support plates 4 and 5, discharge chamber 6, discharge pipe 7, screw hole 11, internally. The present invention is primarily connected with the end of automobile exhaust pipe by means of a water pipe and is filled with water from the pre-set water tank 24' through the water filler 21 at the front end of lower exhaust pipe 2 so that a water level is formed as shown in FIG. 2. When the automobile engine is started and heated for 5 minutes, the dirty smoke (exhaust gas) thereof will enter into the lower exhaust pipe 2 of the present invention through the automobile exhaust pipe and impact the blade 22 at the outlet of lower exhaust pipe submerged in the said water level by mean of the compression force derived from the engine exhaust stroke so as to generate a mixture of said water and exhaust gas therein and to form a whirlpool. Since the density of bubbles derived from the said mixture is lighter than that of water, and as a result of the force of said whirlpool, the bubbles rise rapidly toward the support plates 4 and 5. Because the rising bubbles contains $CO_2$, $N_2$ and $SO_2$ exhausted by the engine, when these bubbles collide with these support plates 4 and 5, these bubbles will break the such toxins as said $CO_2$, $N_2$ and $SO_2$ therein, and these toxins will collide with the walls of said support plates 4 and 5 or flow down along these walls to mix with the water therein. Therefore, most of these toxins will deposit in the water because they collide with these walls, and a few of these toxins will move forward to the front end through the support plates orifices 41 and 51 to collide with the inner walls of tin plates 1 and run into the upper exhaust pipe 3 wherefrom they are exhausted. (Also, on account of the effect of impacting the support plates 4 and 5, the bubbles can also deaden the automobile noise, and these support plates 4 and 5 can also support the exhaust pipes 2 and 3.) A few of bubbles exhausted from the exhaust pipe 3 will once again mix with the water in the discharge chamber and form a fog-like vapor to rise because they are not subject to the impact of blade 22, so they exhaust from the discharge pipe 7 as a colorless, odorless and nontoxious fog-like vapor. It is very simple and convenient to drain the dirty water deposited in the said water level by opening the screw hole 11 at the right bottom for cleaning the interior of the present invention.

I claim:

1. An exhaust purifier for use in connection with an internal combustion engine of a vehicle comprising:
    an outer tank for holding a quantity of water, having a front wall and a rear wall horizontally spaced from said front wall;
    at least one vertically extending inner wall separating a portion of said tank into an inlet chamber, and at least one intermediate chamber;
    a containment means including a containment wall inside said tank defining a discharge chamber, said inlet chamber and at least one intermediate chamber communicating with each other so that said quantity of water maintains a same level in all of said inlet and intermediate chambers, said at least one inner wall having small openings above said water level for transmitting said exhaust gases between said inlet chamber and said at least one intermediate chamber;

a first conduit for delivering exhaust gases from said internal combustion engine into said outer tank, having a first outlet port in said inlet chamber; said first outlet port being inclined to the horizontal;

a rotary blade having a substantially vertical axis of rotation formed at said first outlet port, said first port and blade being submerged in said water when said quantity of water is disposed in said tank, said blade being disposed so that said exhaust gases turn said blade to mix said gases with said water; and a second conduit for delivering gases from said at least one intermediate chamber to said discharge chamber; said second conduit having an inlet in one of said at least one intermediate chamber above said water level and an outlet port in said discharge chamber beneath said water level;

said rear wall having an opening therein;

said discharge communicating with the outside atmosphere through said opening in said rear wall above said water level.

2. An exhaust purifier as in claim 1 wherein said first conduit has a water inlet opening formed therein outside said tank for delivering said water into said tank.

3. An exhaust purifier as in claim 2 further comprising an auxiliary water tank for storing said water, mountable to said vehicle and coupled to said water inlet for delivering said water thereto.

4. An exhaust purifier as in claim 1 or claim 2 wherein said containment wall encloses said discharge chamber, said at least one intermediate chamber comprising two intermediate chambers; one of said at least two vertically extending inner walls separating said two intermediate chambers; said first conduit extending through said two intermediate chambers and two of said inner walls, said second conduit extending through all of said at least two inner walls and into said discharge chamber, said inlet chamber being formed between said two intermediate chambers and said discharge chamber.

5. An exhaust purifier as in claim 1 wherein said rotary blade extends beyond the periphery of said first outlet port.

* * * * *